DOCUMENTS

(12) United States Patent
Gong et al.

(10) Patent No.: US 9,871,626 B2
(45) Date of Patent: Jan. 16, 2018

(54) TRANSMISSION METHOD, DEVICE, AND SYSTEM FOR PHICH

(71) Applicant: ZTE CORPORATION, Shenzhen, Guangdong Province (CN)

(72) Inventors: Yuhong Gong, Shenzhen (CN); Bo Dai, Shenzhen (CN); Yunfeng Sun, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 26 days.

(21) Appl. No.: 14/417,773

(22) PCT Filed: Jul. 4, 2013

(86) PCT No.: PCT/CN2013/078787
§ 371 (c)(1),
(2) Date: Jan. 27, 2015

(87) PCT Pub. No.: WO2014/015741
PCT Pub. Date: Jan. 30, 2014

(65) Prior Publication Data
US 2015/0256299 A1 Sep. 10, 2015

(30) Foreign Application Priority Data
Jul. 27, 2012 (CN) .......................... 2012 1 0264053

(51) Int. Cl.
H04W 4/00 (2009.01)
H04L 1/18 (2006.01)
(Continued)

(52) U.S. Cl.
CPC .......... *H04L 1/1896* (2013.01); *H04L 1/1861* (2013.01); *H04W 72/0466* (2013.01); *H04W 84/042* (2013.01)

(58) Field of Classification Search
USPC .......................... 370/329, 330, 331, 333, 338
See application file for complete search history.

(56) References Cited

U.S. PATENT DOCUMENTS

2012/0033650 A1* 2/2012 Ahn ...................... H04L 5/0091
370/336
2013/0155891 A1* 6/2013 Dinan .................. H04B 7/0456
370/252

FOREIGN PATENT DOCUMENTS

CN 101272232 A 9/2008
CN 101682489 A 3/2010
(Continued)

OTHER PUBLICATIONS

International Search Report (Form PCT/ISA/210) for PCT/CN2013/078787 dated Oct. 17, 2013.
(Continued)

*Primary Examiner* — Zewdu A Beyen
(74) *Attorney, Agent, or Firm* — Koppel, Patrick, Heybl & Philpott

(57) ABSTRACT

Disclosed are a transmission method, device and system for physical hybrid ARQ indicator channel (PHICH). The method comprises the following steps: a NodeB scrambles the PHICH using the determined PHICH resources according to a UE-specific manner and/or a currently used PHICH scrambling code; and the NodeB sends the scrambled PHICH on the determined PHICH resources. Through the disclosure, the problem of PHICH capacity insufficiency, PHICH collisions and interference that caused by the number of user in single cell much larger than that in traditional cell in the related art are solved, the capacity of physical hybrid ARQ indicator channel in downlink resources is improved, and the interference that caused by PHICH collisions is reduced.

9 Claims, 5 Drawing Sheets

(51) Int. Cl.
*H04W 72/04* (2009.01)
*H04W 84/04* (2009.01)

(56) References Cited

FOREIGN PATENT DOCUMENTS

| CN | 102067645 A | 5/2011 | | |
|----|-------------|--------|---|---|
| CN | 102573084 A | 7/2012 | | |
| WO | WO 2012108928 A1 | * | 8/2012 | ............. H04B 7/024 |

OTHER PUBLICATIONS

Written Opinion of the International Searching Authority (Form PCT/ISA/237) forPCT/CN2013/078787 dated Oct. 31, 2013.

* cited by examiner

TRANSMISSION METHOD, DEVICE, AND SYSTEM FOR PHICH

TECHNICAL FIELD

The disclosure relates to the field of communications, and in particular to a transmission method, device and system for a physical hybrid ARQ indicator channel (referred to as PHICH).

BACKGROUND

In an evolved universal terrestrial radio access (referred to as E-UTRA) system of a 3th Generation Partner Project (referred to as 3GPP), data sending/receiving supports a Hybrid Automatic Repeat Request (referred to as HARQ) technology, to reduce data transmission delay and to obtain a higher data transmission rate. In the HARQ technology, a data receiver needs to feed back acknowledgement/non-acknowledgement (referred to as ACK/NACK) information to a data sender, so as to help the data sender to confirm that the data receiver receives correctly.

In a downlink direction of a 3GPP E-UTRA system, a NodeB (such as, an eNodeB) feeds back the ACK/NACK information corresponding to the uplink data to a user equipment (referred to as UE) via a downlink physical hybrid ARQ indicator channel (referred to as PHICH), i.e. the NodeB (such as, the eNodeB) sends the ACK/NACK information to the UE regarding whether a data transmission block from the UE is received correctly thereby.

Transmission of an LTE physical layer PHICH is organized in form of a PHICH group; multiple PHICHs within one PHICH group occupy the same time-frequency domain physical resources, and adopt a multiplexing manner of an orthogonal spread sequence. In a case of a normal cyclic prefix (referred to as Normal CP), a multiplexing manner that a spreading factor is 4 combined with two paths I/Q of BPSK modulation is adopted; and one PHICH group comprises 12 modulation symbols, occupies three resource element groups (referred to as REG), and multiplexes eight PHICHs. When it is an extended cyclic prefix (referred to as Extended CP), with regard to a radio channel with stronger frequency selectivity, a multiplexing manner that a spreading factor is 2 combined with two paths I/Q of BPSK modulation is adopted; one PHICH group comprises six pieces of modulation multiplexing, and multiplexes four PHICHs; and in this case, two PHICH groups jointly occupy physical resources of three REGs.

One PHICH is jointly determined by ID ($n_{PHICH}^{group}$) of the PHICH group and ID ($n_{PHICH}^{seq}$) inside the group.

An index number of the PHICH ($n_{PHICH}^{group}$, $n_{PHICH}^{seq}$) corresponds to a resource position at which the uplink data is transmitted, and specifically, it is determined by a sequence number of the first PRB of corresponding physical uplink shared channel (referred to as PUSCH) data. The PHICHs corresponding to adjacent PRBs may be mapped into different PHICH groups; and a mapping mathematical relationship is:

$$n_{PHICH}^{group} = (I_{PRB\_RA}^{lowest\_index} + n_{DMRS}) \bmod N_{PHICH}^{group} + I_{PHICH} N_{PHICH}^{group},$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH},$$

where $n_{DMRS}$ represents a cyclic shift indicator index of an uplink data demodulation pilot, $I_{PRB\_RA}^{lowest\_index}$ represents a minimum physical resource block index allocated by uplink resources, $N_{SF}^{PHICH}$ represents a size of the spreading factor, and $N_{PHICH}^{group}$ represents the number of the PHICH groups.

FIG. 1 is a schematic diagram of a baseband processing procedure of PHICH according to the related art; as shown in FIG. 1, one-bit ACK/NACK (0/1) information is processed, using a repeat coding manner, to obtain three-bit coded information, and the 12 symbols are obtained after a BPSK modulation and spreading operation ($n_{PHICH}^{seq}$) with a coefficient being 4; and the 12 symbols are mapped on the resource position of the three REGs corresponding to the PHICH group ($n_{PHICH}^{seq}$).

FIG. 2 a schematic diagram of time-frequency domain mapping of PHICH according to the related art; as shown in FIG. 2, in the frequency domain, three REGs corresponding to one PHICH adopts a distributed mapping manner to obtain a diversity gain; while in the time domain, the PHICH has two resource mapping manners, normal and extended. When it is a normal manner, the PHICH is mapped on the first orthogonal frequency division multiplexing (OFDM) symbol of a sub-frame; when the length of a physical downlink control channel (referred to as PDCCH) is 3 (in an MBSFN sub-frame of a hybrid carrier or a time division duplex (TDD) special sub-frame, when the length of the PDCCH is 2), the PHICH may be configured to be an extended PHICH duration; and in this case, the PHICH may be distributed on multiple OFDM symbols which are occupied by the PDCCH.

FIG. 3 is a schematic diagram of a frequency domain initial offset position relationship of different cells of PHICH according to the related art; and as shown in FIG. 3, PHICH resource frequency domain positions of adjacent cells (different Cell IDs) are staggered to each other.

During an LTE-A research stage, many new technologies are introduced, such as coordinated multi-point (referred to as CoMP), carrier aggregation (referred to as CA), and soft cell. In the related art, many new communication scenarios are proposed with regard to these new technologies, wherein in scenarios such as a CoMP scenario 4 and soft cell, the number of users in a single cell is much larger than that in a traditional cell, thus easy to cause the problem of PHICH capacity insufficiency, as well as causing the problems of PHICH collision and interference.

With regard to the problems of PHICH capacity insufficiency, PHICH collision and interference that caused by the number of user in single cell much larger than that in traditional cell in the related technology, no effective solution has been presented.

SUMMARY

The embodiments of the disclosure provides a transmission solution for PHICH, to at least solve the problems of PHICH capacity insufficiency, PHICH collisions and interference that caused by the number of user in single cell much larger than that in traditional cell in the related technology.

According to one aspect of the embodiments of the disclosure, a transmission method for PHICH is provided, comprising: a NodeB determining PHICH resources and/or scrambling the PHICH using a currently used PHICH scrambling code according to a UE-specific manner; and the NodeB sending the scrambled PHICH on the determined PHICH resources.

Preferably, the NodeB determining the PHICH resources according to the UE-specific manner comprises: the NodeB determines PHICH frequency domain resources according to the UE-specific cell identity.

Preferably, the NodeB scrambling the PHICH using the currently used PHICH scrambling code according to the UE-specific manner comprises: the NodeB scrambling the PHICH using a currently used PHICH scrambling code according to a UE-specific cell identity.

Preferably, before the NodeB determines the PHICH resources and/or scrambling the PHICH using the currently used PHICH scrambling code according to the UE-specific manner, the method further comprises: the NodeB notifying the UE-specific cell identity to a user terminal via UE-specific radio resource control (RRC) signaling.

Preferably, the above-mentioned UE-specific cell identity is a UE-specific cell identity used for determining a physical downlink demodulation reference signal.

Preferably, in a case where the PHICH is in an extended PHICH duration, the NodeB determines the PHICH frequency domain resources in a multicast broadcast single frequency network sub-frame or time division duplexing system sub-frames 1 and 6 according to the following formula:

$$\bar{n}_i = \begin{cases} (\lfloor N_{vcID}^{cell} \cdot n_{l'_i} / n_1 \rfloor + m') \bmod n_{l'_i} & i = 0 \\ (\lfloor N_{vcID}^{cell} \cdot n_{l'_i} / n_1 \rfloor + m' + \lfloor n_{l'_i} / 3 \rfloor) \bmod n_{l'_i} & i = 1 \\ (\lfloor N_{vcID}^{cell} \cdot n_{l'_i} / n_1 \rfloor + m' + \lfloor 2n_{l'_i} / 3 \rfloor) \bmod n_{l'_i} & i = 2 \end{cases}$$

where $N_{veID}^{cell}$ represents the UE-specific cell identity, $n_{l'_i}$ is the total number of remaining resource element groups (REGs) apart from a physical control format indicator channel (PCFICH) in the $l'_i$ th symbol, m' is a sequence number of a PHICH group, and $n_1$ is $n_{l'_i}$ when $l'_i=1$.

Preferably, in a case where the PHICH is in a normal PHICH duration, the NodeB determines the PHICH frequency domain resources apart from the s multicast broadcast single frequency network sub-frame and the time division duplexing system sub-frames 1 and 6 according to the following manners:

$$\bar{n}_i = \begin{cases} (\lfloor N_{vcID}^{cell} \cdot n_{l'_i} / n_0 \rfloor + m') \bmod n_{l'_i} & i = 0 \\ (\lfloor N_{vcID}^{cell} \cdot n_{l'_i} / n_0 \rfloor + m' + \lfloor n_{l'_i} / 3 \rfloor) \bmod n_{l'_i} & i = 1 \\ (\lfloor N_{vcID}^{cell} \cdot n_{l'_i} / n_0 \rfloor + m' + \lfloor 2n_{l'_i} / 3 \rfloor) \bmod n_{l'_i} & i = 2 \end{cases}$$

where $N_{veID}^{cell}$ represents the UE-specific cell identity, $n_{l'_i}$ is the total number of remaining resource element groups (REGs) apart from a physical control format indicator channel (PCFICH) in the $l'_i$ th symbol, m' is a sequence number of a PHICH group, and $n_0$ is $n_{l'_i}$ when $l'_i=0$.

Preferably, the NodeB determines the PHICH scrambling code according to the following formula:

$$c_{init} = (\lfloor n_s/2 \rfloor + 1) \cdot (2N_{veID}^{cell} + 1) \cdot 2^9 + N_{veID}^{cell},$$

where $c_{init}$ is an initial value of a scrambling code sequence generator, $N_{veID}^{cell}$ represents the UE-specific cell identity, and $n_s$ is a timeslot index.

Preferably, after the NodeB sends the scrambled PHICH on the determined PHICH resources, the method further comprises: the user terminal descrambling the received scrambled PHICH according to the UE-specific cell identity to which the user terminal belongs.

Preferably, after the NodeB does not send a physical downlink control channel to a user on PHICH resources to which the user belongs, and the NodeB sends the scrambled PHICH on the determined PHICH resources, the method further comprises: the user terminal, which receives the scrambled PHICH, does not monitor or receive the physical downlink control channel on the PHICH resources to which the user terminal belongs.

Preferably, after the NodeB does not send the physical downlink control channel on the PHICH resources, and the NodeB sends the scrambled PHICH on the determined PHICH resources, the method further comprises: the user terminal, which receives the scrambled PHICH, does not monitor or receive the physical downlink control channel on the PHICH resources.

According to another aspect of the embodiments of the disclosure, a transmission device for PHICH is provided, where in the device is located on a NodeB side and comprises: a preprocessing entity configured to determine PHICH resources and/or scramble the PHICH using a currently used PHICH scrambling code according to a UE-specific manner; and a sending entity configured to send the scrambled PHICH on the determined PHICH resources.

Preferably, the preprocessing entity is further configured to determine PHICH frequency domain resources according to a UE-specific cell identity.

Preferably, the preprocessing entity is further configured to scramble the PHICH using a currently used PHICH scrambling code according to a UE-specific cell identity.

Preferably, the device further comprises: a notification entity configured to notify the UE-specific cell identity to a user terminal via UE-specific radio resource control (RRC) signaling.

Preferably, the above-mentioned UE-specific cell identity is a UE-specific cell identity used for determining a physical downlink demodulation reference signal.

Preferably, the reprocessing entity is further configured to, in a case where the PHICH is in an extended PHICH duration, determine the PHICH frequency domain resources in a multicast broadcast single frequency network sub-frame or time division duplexing system sub-frames 1 and 6 according to the following formula:

$$\bar{n}_i = \begin{cases} (\lfloor N_{vcID}^{cell} \cdot n_{l'_i} / n_1 \rfloor + m') \bmod n_{l'_i} & i = 0 \\ (\lfloor N_{vcID}^{cell} \cdot n_{l'_i} / n_1 \rfloor + m' + \lfloor n_{l'_i} / 3 \rfloor) \bmod n_{l'_i} & i = 1 \\ (\lfloor N_{vcID}^{cell} \cdot n_{l'_i} / n_1 \rfloor + m' + \lfloor 2n_{l'_i} / 3 \rfloor) \bmod n_{l'_i} & i = 2 \end{cases}$$

where $N_{veID}^{cell}$ represents the UE-specific cell identity, $n_{l'_i}$ is the total number of remaining resource element groups (REGs) apart from a physical control format indicator channel (PCFICH) in the $l'_i$ th symbol, m' is a sequence number of a PHICH group, and $n_1$ is $n_{l'_i}$ when $l'_i=1$.

Preferably, the reprocessing entity is further configured to, in a case where the PHICH is in a normal PHICH duration, determine the PHICH frequency domain resources apart from the multicast broadcast single frequency network sub-frame and the time division duplexing system sub-frames 1 and 6 according to the following formula:

$$\bar{n}_i = \begin{cases} (\lfloor N_{vcID}^{cell} \cdot n_{l'_i} / n_0 \rfloor + m') \bmod n_{l'_i} & i = 0 \\ (\lfloor N_{vcID}^{cell} \cdot n_{l'_i} / n_0 \rfloor + m' + \lfloor n_{l'_i} / 3 \rfloor) \bmod n_{l'_i} & i = 1 \\ (\lfloor N_{vcID}^{cell} \cdot n_{l'_i} / n_0 \rfloor + m' + \lfloor 2n_{l'_i} / 3 \rfloor) \bmod n_{l'_i} & i = 2 \end{cases}$$

where $N_{veID}^{cell}$ represents the UE-specific cell identity, $n_{l'_i}$ is the total number of the remaining resource element groups (REGs) apart from a Physical Control Format Indicator Channel (PCFICH) in the $l_i'$ th symbol, m' is the sequence number of the PHICH group, and $n_0$ is $n_{l'_i}$ when $l'_i=0$.

Preferably, the preprocessing entity is further configured to determine the PHICH scrambling code according to the following formula:

$$c_{init}=(\lfloor n_s/2 \rfloor+1)\cdot(2N_{veID}^{cell}+1)\cdot 2^9+N_{veID}^{cell},$$

where $c_{init}$ is an initial value of a scrambling code sequence generator, $N_{veID}^{cell}$ represents the UE-specific cell identity, and $n_s$ is a timeslot index.

According to yet another aspect of the embodiments of the disclosure, a user terminal is provided, comprising: a receiving entity, configured to receive a scrambled PHICH from a NodeB, wherein the scrambled PHICH is sent on PHICH resources determined by the NodeB according to a UE-specific manner, and/or the scrambled PHICH is a PHICH which is scrambled by the NodeB using a currently used PHICH scrambling code according to the UE-specific manner.

Preferably, the user terminal further comprises: a descrambling entity configured to descramble the received scrambled PHICH according to the UE-specific cell identity to which the user terminal belongs.

Preferably, the receiving entity is further configured not to, in a case where the NodeB does not send a physical downlink control channel to a user on PHICH resources to which the user belongs, but sends the scrambled PHICH on the determined PHICH resources, monitor or receive the physical downlink control channel on the PHICH resources to which the user terminal belongs.

Preferably, the receiving entity is further configured not to, in a case where the NodeB does not send the physical downlink control channel on the PHICH resources, but sends the scrambled PHICH on the determined PHICH resources, monitor or receive the physical downlink control channel on the PHICH resources.

According to still another aspect of the embodiments of the disclosure, a transmission system of a PHICH is provided, comprising: the above-mentioned transmission device of a PHICH and the above-mentioned user terminal.

According to another aspect of embodiments of the disclosure, a transmission system for PHICH is provided, wherein the transmission system comprises: the above-mentioned transmission device for PHICH and the above-mentioned user terminal.

In the embodiments of the disclosure, a NodeB determines PHICH resources and/or scrambles the PHICH according to a UE-specific manner, so that the problems of PHICH capacity insufficiency, PHICH collisions and interference that caused by the number of user in single cell much larger than that in traditional cell in the related art are solved, thus improving the capacity of PHICH in downlink resources and reducing the interference that caused by PHICH collisions.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The preferred embodiments are described in conjunction with the drawings as follows. It shall be understood that the preferred embodiments described herein are only used to describe and explain the present invention and shall not be construed as improper limitations on the same. The embodiments of the present application and the features of the embodiments can be combined with each other if there is no conflict.

Figure 1:
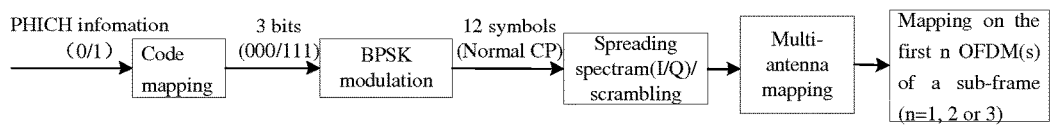
FIG. 1 is a schematic diagram of a baseband processing procedure of PHICH according to the related art.
Figure 2:
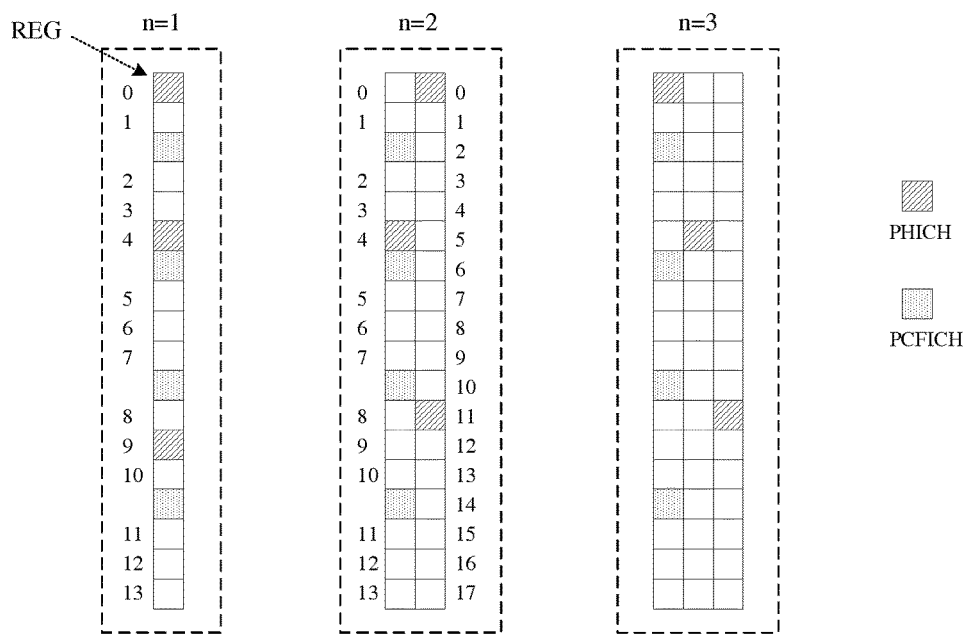
FIG. 2 is a schematic diagram of time-frequency domain mapping of PHICH according to the related art.
Figure 3:
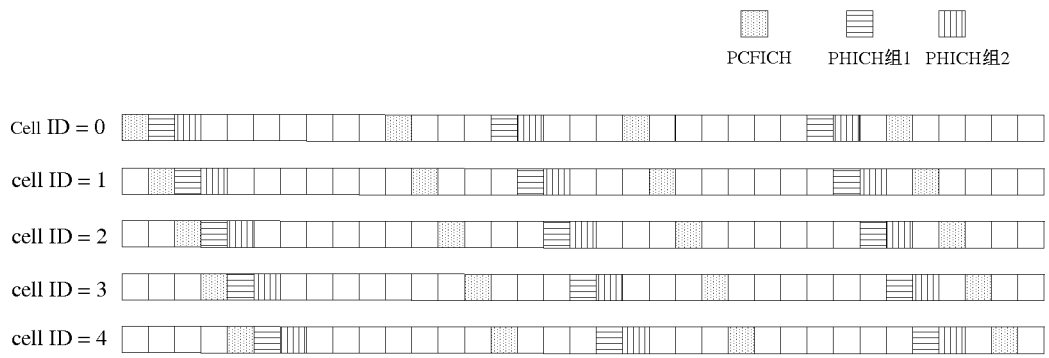
FIG. 3 is a schematic diagram a frequency domain initial offset position relationship of different cells of PHICH according to the related art.
Figure 4:
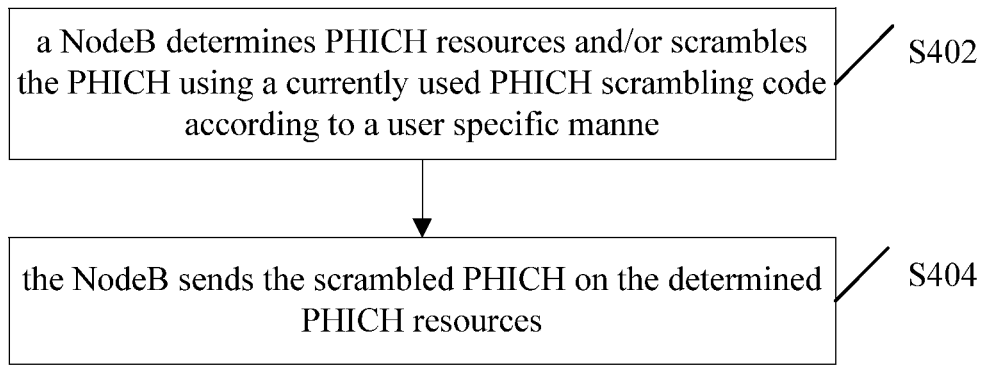
FIG. 4 is a flow chart of a transmission method for PHICH according to an embodiment of the disclosure.

According to an embodiment of the disclosure, a transmission method for PHICH (PHICH) is provided. FIG. 4 is a flow chart of a transmission method for PHICH according to an embodiment of the disclosure; and as shown in FIG. 4, the method comprises the following steps:

step S402, a NodeB determines PHICH resources and/or scrambles the PHICH using a currently used PHICH scrambling code according to a UE-specific manner; and step S404, the NodeB sends the scrambled PHICH on the determined PHICH resources.

Through the above-mentioned steps, the NodeB determines the PHICH resources and/or scrambles the PHICH according to the UE-specific manner, so that the problems of PHICH capacity insufficiency, PHICH collisions and interference that caused by the number of user in single cell much larger than that in traditional cell in the related art are solved, the capacity of physical hybrid ARQ indicator channel in downlink resources is improved, and the interference that caused by PHICH collisions is reduced.

During an implementation, the step S402 may implemented through the following manners:

manner 1, the NodeB determines the PHICH resources according to the UE-specific manner;

manner 2, the NodeB scrambles the PHICH using the currently used PHICH scrambling code according to a UE-specific manner; and manner 3, the NodeB determines the PHICH resources according to the UE-specific manner, and scrambles the PHICH using the currently used PHICH scrambling code according to the UE-specific manner.

Herein, when the NodeB obtains the scrambled PHICH by adopting manner 2, and manner 3, descrambling is performed, on the user side, according to a UE-specific manner.

It should be noted that, during an implementation, the UE-specific manner adopted by the NodeB for determining the PHICH resources and the UE-specific manner adopted for scrambling/descrambling may be the same or different.

Before the step S402, the NodeB may also notify a UE-specific cell identity to a user terminal via a UE-specific radio resource control (referred to as RRC) signaling. Herein, each user terminal may be taken as a user, and thus the accuracy of the user side receiving a message from the NodeB may be improved.

In the step S402, the NodeB determining the PHICH resources according to the UE-specific manner may comprise: the NodeB determines PHICH frequency domain resources according to a UE-specific cell identity. The NodeB scrambling the PHICH using the currently used PHICH scrambling code according to the UE-specific manner may comprise: the NodeB scrambles the PHICH using the currently used PHICH scrambling code according to the UE-specific cell identity. After the step S404, the user terminal may descramble the received scrambled PHICH according to the UE-specific cell identity to which the user terminal belongs. The UE-specific cell identity may be a UE-specific cell identity used for determining a physical downlink demodulation reference signal. In this way, the NodeB may determine the PHICH resources and perform the scrambling according to the UE-specific cell identity, thus improving the process capability of the system.

Preferably, in a Multicast/Multi-casting Broadcast Single Frequency Network (MBSFN) subframe or in time division duplexing system sub-frames 1 and 6, and in the case where the PHICH is extended PHICH, in the step S402, the NodeB may determine frequency domain resources of the PHICH according to the following formula:

$$\bar{n}_i = \begin{cases} (\lfloor N_{veID}^{cell} \cdot n_{l'_i}/n_1 \rfloor + m') \bmod n_{l'_i} & i = 0 \\ (\lfloor N_{veID}^{cell} \cdot n_{l'_i}/n_1 \rfloor + m' + \lfloor n_{l'_i}/3 \rfloor) \bmod n_{l'_i} & i = 1 \\ (\lfloor N_{veID}^{cell} \cdot n_{l'_i}/n_1 \rfloor + m' + \lfloor 2n_{l'_i}/3 \rfloor) \bmod n_{l'_i} & i = 2 \end{cases}$$

where $N_{veID}^{cell}$ represents the UE-specific cell identity, $n_{l'_i}$ is the total number of remaining resource element groups (REGs) apart from a physical control format indicator channel (PCFICH) in the $l'_i$ th symbol, m' is a sequence number of a PHICH group, and $n_1$ is $n_{l'_i}$ when $l'_i=1$.

Preferably, in other cases apart from the MBSFN subframe and time division duplexing system sub-frames 1 and 6, in step S402, the NodeB may determine frequency domain resources of a normal PHICH according to the following formula:

$$\bar{n}_i = \begin{cases} (\lfloor N_{veID}^{cell} \cdot n_{l'_i}/n_0 \rfloor + m') \bmod n_{l'_i} & i = 0 \\ (\lfloor N_{veID}^{cell} \cdot n_{l'_i}/n_0 \rfloor + m' + \lfloor n_{l'_i}/3 \rfloor) \bmod n_{l'_i} & i = 1 \\ (\lfloor N_{veID}^{cell} \cdot n_{l'_i}/n_0 \rfloor + m' + \lfloor 2n_{l'_i}/3 \rfloor) \bmod n_{l'_i} & i = 2 \end{cases}$$

where $n_{veID}^{cell}$ represents the UE-specific cell identity, $n_{l'_i}$ is the total number of the remaining resource element groups (REGs) apart from the physical control format indicator channel (PCFICH) in the $l'_i$ th symbol, m' is the sequence number of the PHICH group, and $n_0$ is $n_{l'_i}$ when $l'_i=0$.

Preferably, in step S402, the NodeB may determine the scrambling code for the PHICH according to the following formula:

$$c_{init} = (\lfloor n_s/2 \rfloor + 1) \cdot (2N_{veID}^{cell} + 1) \cdot 2^9 + N_{veID}^{cell},$$

where $C_{init}$ is an initial value of a scrambling code sequence generator, $N_{veID}^{cell}$ represents the UE-specific cell identity, and $n_s$ is a timeslot index.

During an implementation, if the NodeB does not send a physical downlink control channel to a user on PHICH resources to which the user belongs, after step S404, the user terminal, which receives the scrambled PHICH, may not monitor or receive the physical downlink control channel on the PHICH resources to which the user terminal belongs. If the NodeB does not send a physical downlink control channel on the PHICH resources, after step S404, the user terminal, which receives the scrambled PHICH, may not monitor or receive the physical downlink control channel on the PHICH resources.

Figure 5:
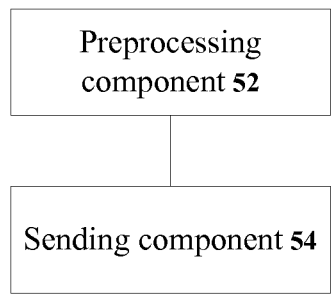
FIG. 5 is a structure block diagram of a transmission device for PHICH according to an embodiment of the disclosure.

Corresponding to the above-mentioned method, an embodiment of the disclosure further provides a transmission device for PHICH. FIG. 5 is a structure block diagram of a transmission device for PHICH according to an embodiment of the disclosure; and as shown in FIG. 5, the device 50 is located on the NodeB side and comprises: a preprocessing entity 52 configured to determine PHICH resources and/or scrambles the PHICH using a currently used PHICH scrambling code according to a UE-specific manner; and a sending entity 54 coupled to the preprocessing entity 52 and configured to send the scrambled PHICH on the determined PHICH resources.

According to above-mentioned device 50, the preprocessing entity 52 determines PHICH resources and/or scrambles the PHICH according to the UE-specific manner, and the sending entity 54 sends the scrambled PHICH on the determined PHICH resources, and thus the problems of PHICH capacity insufficiency, PHICH collisions and interference that caused by the number of user in single cell much larger than that in traditional cell in the related art are solved, the capacity of physical hybrid ARQ indicator channel in downlink resources is improved, and the interference that caused by PHICH collisions is reduced.

Preferably, the preprocessing entity 52 is further configured to determine PHICH frequency domain resources and/or scramble the PHICH using the currently used PHICH scrambling code according to the UE-specific cell identity.

Figure 6:
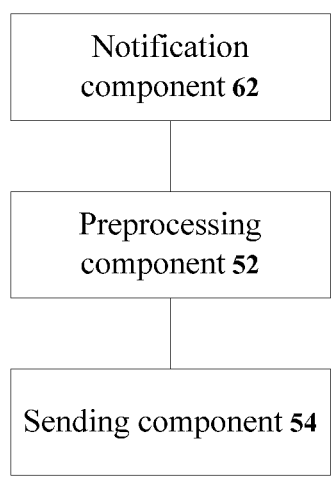
FIG. 6 is a structure block diagram of a transmission device for PHICH according to a preferred embodiment of the disclosure.

FIG. 6 is a structure block diagram of a transmission device for PHICH according to a preferred embodiment of the disclosure; and as shown in FIG. 6, the device 50 further comprises: a notification entity 62 coupled to the preprocessing entity 52 and configured to notify the UE-specific cell identity to a user terminal via a UE-specific radio resource control (RRC) signaling.

Preferably, the above-mentioned UE-specific cell identity is a UE-specific cell identity used for determining a physical downlink demodulation reference signal.

Preferably, the reprocessing entity 52 is further configured to, in a case where the PHICH is in an extended PHICH duration, determine the PHICH frequency domain resources in a multicast broadcast single frequency network sub-frame or time division duplexing system sub-frames 1 and 6 according to the following formula:

$$\bar{n}_i = \begin{cases} (\lfloor N_{veID}^{cell} \cdot n_{l'_i}/n_1 \rfloor + m')\mathrm{mod}\, n_{l'_i} & i=0 \\ (\lfloor N_{veID}^{cell} \cdot n_{l'_i}/n_1 \rfloor + m' + \lfloor n_{l'_i}/3 \rfloor)\mathrm{mod}\, n_{l'_i} & i=1 \\ (\lfloor N_{veID}^{cell} \cdot n_{l'_i}/n_1 \rfloor + m' + \lfloor 2n_{l'_i}/3 \rfloor)\mathrm{mod}\, n_{l'_i} & i=2 \end{cases}$$

where $N_{veID}^{cell}$ represents the UE-specific cell identity, $n_{l'_i}$ is the total number of remaining resource element groups (REGs) apart from a physical control format indicator channel (PCFICH) in the $l'_i$ th symbol, m' is a sequence number of a PHICH group, and $n_1$ is $n_{l'_i}$ when $l'_i=1$.

Preferably, the reprocessing entity 52 is further configured to, in a case where the PHICH is in a normal PHICH duration, determine the PHICH frequency domain resources apart from the multicast broadcast single frequency network sub-frame and the time division duplexing system sub-frames 1 and 6 according to the following formula:

$$\bar{n}_i = \begin{cases} (\lfloor N_{veID}^{cell} \cdot n_{l'_i}/n_0 \rfloor + m')\mathrm{mod}\, n_{l'_i} & i=0 \\ (\lfloor N_{veID}^{cell} \cdot n_{l'_i}/n_0 \rfloor + m' + \lfloor n_{l'_i}/3 \rfloor)\mathrm{mod}\, n_{l'_i} & i=1 \\ (\lfloor N_{veID}^{cell} \cdot n_{l'_i}/n_0 \rfloor + m' + \lfloor 2n_{l'_i}/3 \rfloor)\mathrm{mod}\, n_{l'_i} & i=2 \end{cases}$$

where $N_{veID}^{cell}$ represents the UE-specific cell identity, $n_{l'_i}$ is the total number of the remaining resource element groups (REGs) apart from the physical control format indicator channel (PCFICH) in the $l'_i$ th symbol, m' is the sequence number of the PHICH group, and $n_0$ is $n_{l'_i}$ when $l'_i=0$.

Preferably, the preprocessing entity 52 is further configured to determine the scrambling code of the PHICH according to the following formula:

$$c_{init}=(\lfloor n_s/2 \rfloor+1)\cdot(2N_{veID}^{cell}+1)\cdot 2^9 + N_{veID}^{cell},$$

where $c_{init}$ is an initial value of a scrambling code sequence generator, $N_{veID}^{cell}$ represents the UE-specific cell identity, and $n_s$ is a timeslot index.

Figure 7:
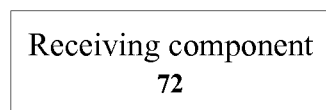
FIG. 7 is a structural block diagram of a user terminal according to an embodiment of the disclosure.

An embodiment of the disclosure further provides a user terminal. FIG. 7 is a structural block diagram of a user terminal according to an embodiment of the disclosure; and as shown in FIG. 7, the user terminal 70 comprises: a receiving entity 72 coupled to the sending entity 54 and configured to receive a scrambled PHICH from a NodeB, wherein the scrambled PHICH is sent on PHICH resources determined by the NodeB according to a UE-specific manner, and/or the scrambled PHICH is obtained after the NodeB scrambles the PHICH using a currently used PHICH scrambling code according to the UE-specific manner.

Figure 8:
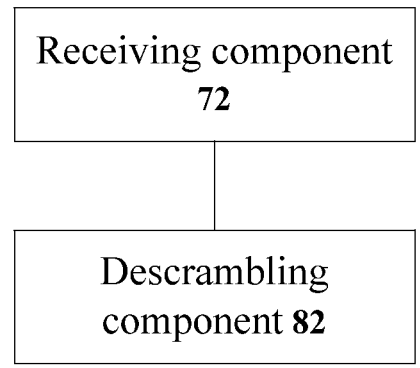
FIG. 8 is a structural block diagram of a user terminal according to a preferred embodiment of the disclosure.

FIG. 8 is a structural block diagram of a user terminal according to a preferred embodiment of the disclosure; and as shown in FIG. 8, the user terminal 70 further comprises: a descrambling entity 82 coupled to the receiving entity 72 and configured to descramble the received scrambled PHICH according to the UE-specific cell identity to which the user terminal belongs.

Preferably, the receiving entity 72 is further configured not to, in a case where the NodeB does not send a physical downlink control channel to a user on PHICH resources to which the user belongs, but sends the scrambled PHICH on the determined PHICH resources, monitor or receive the physical downlink control channel on the PHICH resources to which the user terminal belongs.

Preferably, the receiving entity 72 is further configured not to, in a case where the NodeB does not send the physical downlink control channel on the PHICH resources, but sends the scrambled PHICH on the determined PHICH resources, monitor or receive the physical downlink control channel on the PHICH resources.

Figure 9:
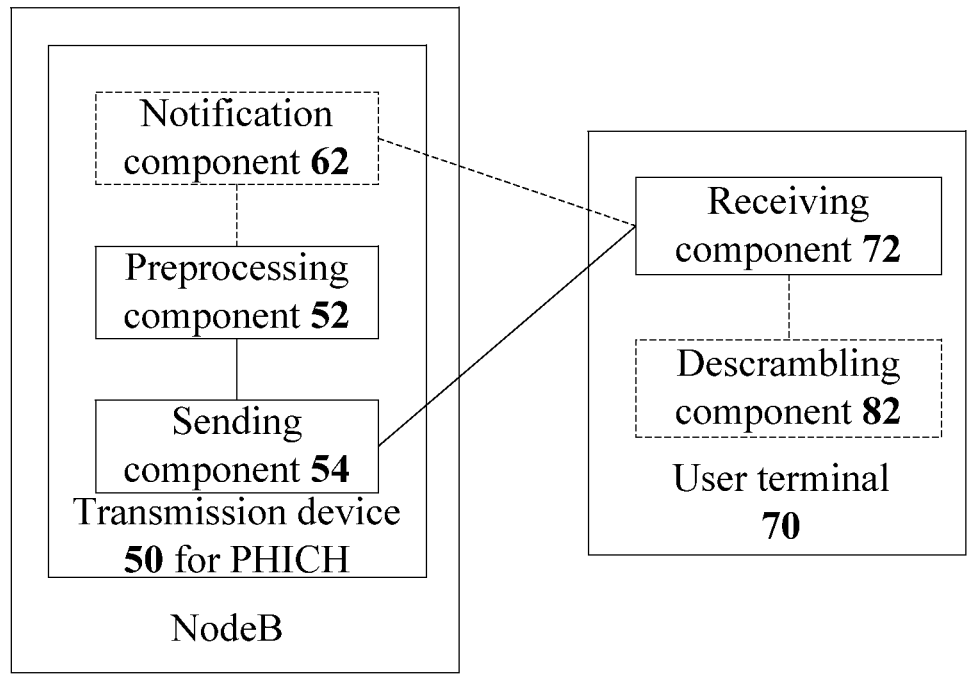
FIG. 9 is a structure block diagram of a transmission system for PHICH according to an embodiment of the disclosure.

An embodiment of the disclosure further provides a transmission system for PHICH. FIG. 9 is a structure block diagram of a transmission system for PHICH according to an embodiment of the disclosure; and as shown in FIG. 9, the system comprises: the above-mentioned transmission device 50 for PHICH and the above-mentioned user terminal 70.

The implementation process of the above-mentioned embodiments is further described below in detail with reference to preferred embodiments and drawings.

Embodiment 1

The present embodiment provides a transmission method for PHICH; and the flow of the method is as follows:

a NodeB notifies a UE-specific cell identity used for determining PHICH resources to a user via UE-specific radio resource control (RRC) signaling.

The NodeB determines PHICH frequency domain resources of the user according to the UE-specific cell identity.

The NodeB sends the PHICH on the above-mentioned determined PHICH domain resources.

The user receives the PHICH according to the UE-specific cell identity.

Embodiment 2

The present embodiment provides a transmission method for PHICH; and the flow of the method is as follows:

a NodeB notifies a UE-specific cell identity used for determining PHICH resources to a user via UE-specific radio resource control (RRC) signaling.

The NodeB determines PHICH frequency domain resources of the user according to the UE-specific cell identity.

The NodeB sends the PHICH on the above-mentioned determined PHICH domain resources.

The user receives the PHICH according to the UE-specific cell identity.

The NodeB does not send a physical downlink control channel to the user on the PHICH resources to which the user belongs; and the user does not monitor or receive the physical downlink control channel on the PHICH resources to which the user belongs.

Embodiment 3

The present embodiment provides a transmission method for PHICH; and the flow of the method is as follows:

a NodeB notifies a UE-specific cell identity used for determining PHICH resources to a user via UE-specific radio resource control (RRC) signaling.

The NodeB determines PHICH frequency domain resources of the user according to the UE-specific cell identity.

The NodeB sends the PHICH on the above-mentioned determined PHICH domain resources.

The user receives the PHICH according to the UE-specific cell identity.

The NodeB does not send a physical downlink control channel on the PHICH; and the user does not monitor or receive the physical downlink control channel on the PHICH resources.

Embodiment 4

The present embodiment provides a transmission method for PHICH; and the flow of the method is as follows:

a NodeB determines PHICH resources according to a UE-specific cell identity used for a downlink demodulation reference signal.

The NodeB determines PHICH frequency domain resources of the user according to the UE-specific cell identity.

The NodeB sends the PHICH on the above-mentioned determined PHICH domain resources.

The user receives the PHICH according to the UE-specific cell identity.

Embodiment 5

The present embodiment provides a transmission method for PHICH; and the flow of the method is as follows:

a NodeB determines PHICH resources according to a UE-specific cell identity used for a downlink demodulation reference signal.

The NodeB determines PHICH frequency domain resources of the user according to the UE-specific cell identity.

The NodeB sends the PHICH on the above-mentioned determined PHICH domain resources.

The user receives the PHICH according to the UE-specific cell identity.

The NodeB does not send a physical downlink control channel to the user on the PHICH resources to which the user belongs; and the user does not monitor or receive the physical downlink control channel on the PHICH resources to which the user belongs.

Embodiment 6

The present embodiment provides a transmission method for PHICH; and the flow of the method is as follows:

A NodeB determines PHICH resources according to a UE-specific cell identity used for a downlink demodulation reference signal.

The NodeB determines PHICH frequency domain resources of the user according to the UE-specific cell identity.

The NodeB sends the PHICH on the above-mentioned determined PHICH domain resources.

The user receives the PHICH according to the UE-specific cell identity.

The NodeB does not send a physical downlink control channel on the PHICH; and the user does not monitor or receive the physical downlink control channel on the PHICH resources.

Embodiment 7

The present embodiment provides a transmission method for PHICH; and the flow of the method is as follows:

a NodeB notifies a UE-specific cell identity used for determining PHICH resources and a PHICH scrambling code to a user via UE-specific radio resource control (RRC) signaling.

The NodeB determines PHICH frequency domain resources of the user according to the UE-specific cell identity.

The NodeB determines a PHICH scrambling code for the user according to the UE-specific cell identity.

The NodeB sends the scrambled PHICH according to the above-mentioned manner on the above-mentioned determined PHICH frequency domain resources.

The user receives the PHICH and descrambles the PHICH according to the UE-specific cell identity.

Embodiment 8

The present embodiment provides a transmission method for PHICH; and the flow of the method is as follows:

A NodeB notifies a UE-specific cell identity used for determining PHICH resources and a PHICH scrambling code to a user via UE-specific radio resource control (RRC) signaling.

The NodeB determines PHICH frequency domain resources of the user according to the UE-specific cell identity.

The NodeB determines a PHICH scrambling code for the user according to the UE-specific cell identity.

The NodeB sends the PHICH channel scrambled according to the above-mentioned manner on the above-mentioned determined PHICH frequency domain resources.

The user receives the PHICH and descrambles the PHICH according to the UE-specific cell identity.

The NodeB does not send a physical downlink control channel to the user on PHICH resources to which the user belongs; and the user does not monitor or receive the physical downlink control channel on the PHICH resources to which the user belongs.

Embodiment 9

The present embodiment provides a transmission method for PHICH; and the flow of the method is as follows:

A NodeB notifies a UE-specific cell identity used for determining PHICH resources and a PHICH scrambling code to a user via UE-specific radio resource control (RRC) signaling.

The NodeB determines PHICH frequency domain resources of the user according to the UE-specific cell identity.

The NodeB determines a PHICH scrambling code of the user according to the UE-specific cell identity.

The NodeB sends the PHICH channel scrambled according to the above-mentioned manner on the above-mentioned determined PHICH frequency domain resources.

The user receives the PHICH and descrambles the PHICH according to the UE-specific cell identity.

The NodeB does not send a physical downlink control channel on the PHICH; and the user does not monitor or receive the physical downlink control channel on the PHICH resources.

Embodiment 10

The present embodiment provides a transmission method for PHICH; and the flow of the method is as follows:

A NodeB determines PHICH resources and a scrambling code according to a UE-specific cell identity used for a downlink demodulation reference signal.

The NodeB determines PHICH frequency domain resources for the user according to the UE-specific cell identity.

The NodeB determines a PHICH scrambling code for the user according to the UE-specific cell identity.

The NodeB sends the PHICH scrambling code according to the above-mentioned manner on the above-mentioned determined PHICH frequency domain resources.

The user receives the PHICH and descrambling the PHICH according to the UE-specific cell identity.

Embodiment 11

The present embodiment provides a transmission method for PHICH; and the flow of the method is as follows:

A NodeB determines PHICH resources and a scrambling code according to a UE-specific cell identity used for a downlink demodulation reference signal.

The NodeB determines PHICH frequency domain resources of the user according to the UE-specific cell identity.

The NodeB determines a PHICH scrambling code of the user according to the UE-specific cell identity.

The NodeB sends the PHICH channel scrambled according to the above-mentioned manner on the above-mentioned determined PHICH frequency domain resources.

The user receives the PHICH and descrambles the PHICH according to the UE-specific cell identity.

The NodeB does not send a physical downlink control channel to the user on the PHICH resources to which the user belongs; and the user does not monitor or receive the physical downlink control channel on the PHICH resources to which the user belongs.

Embodiment 12

The present embodiment provides a transmission method for PHICH; and the flow of the method is as follows:

A NodeB determines PHICH resources and a scrambling code according to a UE-specific cell identity used for a downlink demodulation reference signal.

The NodeB determines PHICH frequency domain resources for the user according to the UE-specific cell identity.

The NodeB determines a PHICH scrambling code for the user according to the UE-specific cell identity.

The NodeB sends the PHICH channel scrambled according to the above-mentioned manner on the above-mentioned determined PHICH frequency domain resources.

The user receives the PHICH and descrambles the PHICH according to the UE-specific cell identity.

The NodeB does not send a physical downlink control channel on the PHICH; and the user does not monitor or receive the physical downlink control channel on the PHICH resources.

Embodiment 13

Figure 10:
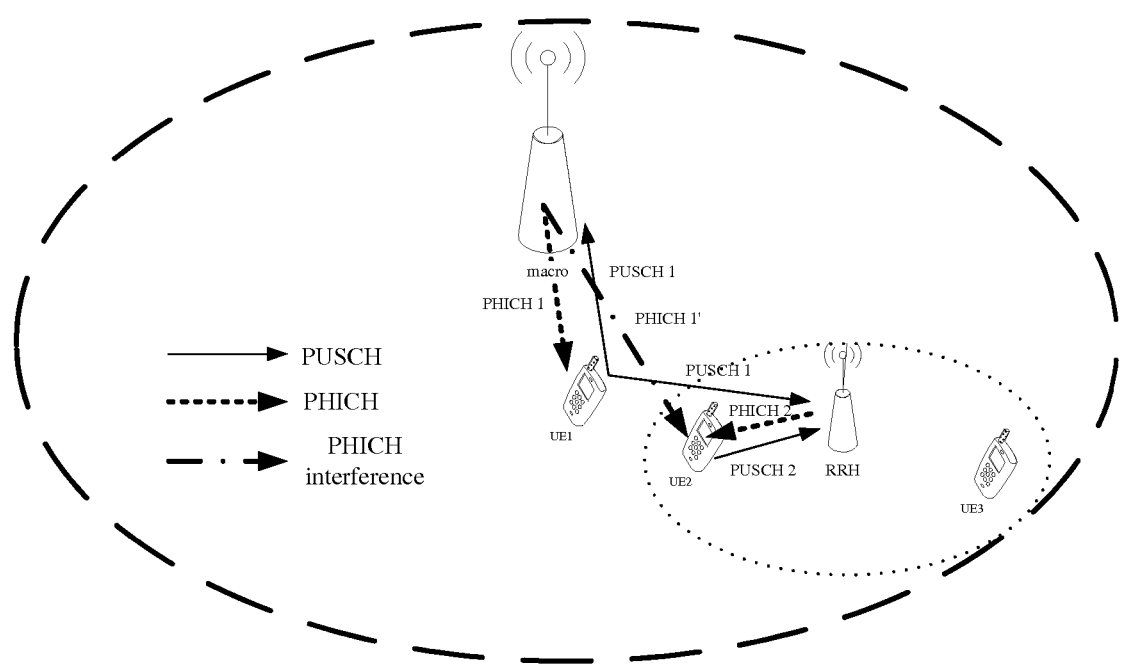
FIG. 10 is a schematic diagram of PHICH interference in a soft cell scenario according to embodiment 13 of the disclosure.

FIG. 10 is a schematic diagram of a PHICH interference in a soft cell scenario according to embodiment 13 of the disclosure; and as show in FIG. 10, it is assumed that a UE-specific cell identity allocated by a NodeB to user 1 is $N_{veID1}^{cell}$; and a UE-specific cell identity allocated to user 2 is $N_{veID2}^{cell}$.

Firstly, the NodeB determines PHICH frequency domain resources for user 1 on the basis of the UE-specific cell identity of user 1 according to the following formula:

$$\bar{n}_i = \begin{cases} (\lfloor N_{vcID1}^{cell} \cdot n_{l'_i}/n_0 \rfloor + m')\bmod n_{l'_i} & i = 0 \\ (\lfloor N_{vcID1}^{cell} \cdot n_{l'_i}/n_0 \rfloor + m' + \lfloor n_{l'_i}/3 \rfloor)\bmod n_{l'_i} & i = 1 \\ (\lfloor N_{vcID1}^{cell} \cdot n_{l'_i}/n_0 \rfloor + m' + \lfloor 2n_{l'_i}/3 \rfloor)\bmod n_{l'_i} & i = 2 \end{cases}$$

and specially, in a multicast/multi-casting broadcast single frequency network (MBSFN) sub-frame or in time division duplexing (TDD) system sub-frames 1 and 6, and in a case where the PHICH is in an extended PHICH duration, the NodeB determines the PHICH frequency domain resources for user 1 according to the following formula:

$$\bar{n}_i = \begin{cases} (\lfloor N_{vcID1}^{cell} \cdot n_{l'_i}/n_1 \rfloor + m')\bmod n_{l'_i} & i = 0 \\ (\lfloor N_{vcID1}^{cell} \cdot n_{l'_i}/n_1 \rfloor + m' + \lfloor n_{l'_i}/3 \rfloor)\bmod n_{l'_i} & i = 1 \\ (\lfloor N_{vcID1}^{cell} \cdot n_{l'_i}/n_1 \rfloor + m' + \lfloor 2n_{l'_i}/3 \rfloor)\bmod n_{l'_i} & i = 2 \end{cases}$$

Secondly, the NodeB determines PHICH frequency domain resources for user 2 on the basis of the above-mentioned UE-specific cell identity of user 2 according to the following formula:

$$\bar{n}_i = \begin{cases} (\lfloor N_{vcID2}^{cell} \cdot n_{l'_i}/n_0 \rfloor + m')\bmod n_{l'_i} & i = 0 \\ (\lfloor N_{vcID2}^{cell} \cdot n_{l'_i}/n_0 \rfloor + m' + \lfloor n_{l'_i}/3 \rfloor)\bmod n_{l'_i} & i = 1 \\ (\lfloor N_{vcID2}^{cell} \cdot n_{l'_i}/n_0 \rfloor + m' + \lfloor 2n_{l'_i}/3 \rfloor)\bmod n_{l'_i} & i = 2 \end{cases}$$

and specially, in a multicast/multi-casting broadcast single frequency network s (MBSFN) sub-frame or in time division duplexing (TDD) system sub-frames 1 and 6, and in a case where the PHICH is in an extended PHICH duration, the NodeB determines the PHICH frequency domain resources for user 2 according to the following formula:

$$\bar{n}_i = \begin{cases} (\lfloor N_{vcID2}^{cell} \cdot n_{l'_i}/n_1 \rfloor + m')\bmod n_{l'_i} & i = 0 \\ (\lfloor N_{vcID2}^{cell} \cdot n_{l'_i}/n_1 \rfloor + m' + \lfloor n_{l'_i}/3 \rfloor)\bmod n_{l'_i} & i = 1 \\ (\lfloor N_{vcID2}^{cell} \cdot n_{l'_i}/n_1 \rfloor + m' + \lfloor 2n_{l'_i}/3 \rfloor)\bmod n_{l'_i} & i = 2 \end{cases}$$

where $N_{veID1}^{cell}$ represents the UE-specific cell identity of user 1, $N_{veID2}^{cell}$ represents the UE-specific cell identity of user 2, $n_{l'_i}$ is the total number of remaining resource element groups (REGs) apart from a PCFICH in the $:l'_i$ th symbol, and m' is a sequence number of a PHICH group.

During an implementation, the NodeB sends the PHICH to user 1 on the above-mentioned PHICH resources which is determined for user 1; the NodeB does not send the PDCCH for user 1 to user 1 on the PHICH resources; and the user 1 does not monitor or receive the PDCCH on the PHICH resources.

The NodeB sends PHICH to user 2 on the above-mentioned PHICH resources which is determined for user 2; the NodeB does not send a PDCCH for user 2 to user 2 on the PHICH resources; and the user 2 does not monitor or receive the PDCCH on the PHICH resources.

Embodiment 14

As shown in FIG. 10, it is assumed that a UE-specific cell identity allocated by a NodeB to user 1 is $N_{veID1}^{cell}$ and a UE-specific cell identity allocated to user 2 is $N_{veID2}^{cell}$.

Firstly, the NodeB determines PHICH frequency domain resources for user 1 on the basis of the above-mentioned UE-specific cell identity of user 1 according to the following formula:

$$\bar{n}_i = \begin{cases} (\lfloor N_{vcID1}^{cell} \cdot n_{l'_i}/n_0 \rfloor + m')\bmod n_{l'_i} & i = 0 \\ (\lfloor N_{vcID1}^{cell} \cdot n_{l'_i}/n_0 \rfloor + m' + \lfloor n_{l'_i}/3 \rfloor)\bmod n_{l'_i} & i = 1 \\ (\lfloor N_{vcID1}^{cell} \cdot n_{l'_i}/n_0 \rfloor + m' + \lfloor 2n_{l'_i}/3 \rfloor)\bmod n_{l'_i} & i = 2 \end{cases}$$

and specially, in a multicast/multi-casting broadcast single frequency network (MBSFN) sub-frame or in time division duplexing (TDD) system sub-frames 1 and 6, and in a case where the PHICH is in an extended PHICH duration, the NodeB determines the PHICH frequency domain resources for user 1 according to the following formula:

$$\bar{n}_i = \begin{cases} (\lfloor N_{vcID1}^{cell} \cdot n_{l'_i}/n_1 \rfloor + m')\bmod n_{l'_i} & i = 0 \\ (\lfloor N_{vcID1}^{cell} \cdot n_{l'_i}/n_1 \rfloor + m' + \lfloor n_{l'_i}/3 \rfloor)\bmod n_{l'_i} & i = 1 \\ (\lfloor N_{vcID1}^{cell} \cdot n_{l'_i}/n_1 \rfloor + m' + \lfloor 2n_{l'_i}/3 \rfloor)\bmod n_{l'_i} & i = 2 \end{cases}$$

Secondly, the NodeB determines PHICH frequency domain resources for user 2 on the basis of the above-mentioned UE-specific cell identity of user 2 according to the following formula:

$$\overline{n}_i = \begin{cases} (\lfloor N_{vcID2}^{cell} \cdot n_{l'_i}/n_0 \rfloor + m') \bmod n_{l'_i} & i=0 \\ (\lfloor N_{vcID2}^{cell} \cdot n_{l'_i}/n_0 \rfloor + m' + \lfloor n_{l'_i}/3 \rfloor) \bmod n_{l'_i} & i=1 \\ (\lfloor N_{vcID2}^{cell} \cdot n_{l'_i}/n_0 \rfloor + m' + \lfloor 2n_{l'_i}/3 \rfloor) \bmod n_{l'_i} & i=2 \end{cases}$$

and specially, in a multicast/multi-casting broadcast single frequency network (MBSFN) sub-frame or in time division duplexing (TDD) system sub-frames 1 and 6, and in a case where the PHICH is in an extended PHICH duration, the NodeB determines the PHICH frequency domain resources for user 2 according to the following formula:

$$\overline{n}_i = \begin{cases} (\lfloor N_{vcID2}^{cell} \cdot n_{l'_i}/n_1 \rfloor + m') \bmod n_{l'_i} & i=0 \\ (\lfloor N_{vcID2}^{cell} \cdot n_{l'_i}/n_1 \rfloor + m' + \lfloor n_{l'_i}/3 \rfloor) \bmod n_{l'_i} & i=1 \\ (\lfloor N_{vcID2}^{cell} \cdot n_{l'_i}/n_1 \rfloor + m' + \lfloor 2n_{l'_i}/3 \rfloor) \bmod n_{l'_i} & i=2 \end{cases}$$

where $N_{veID1}^{cell}$ represents the UE-specific cell identity of user 1, $N_{veID2}^{cell}$ represents the UE-specific cell identity of user 2, $n_{l'_i}$ is the total number of remaining resource element groups (REGs) apart from a physical control format indicator channel (PCFICH) in the $l'_i$ th symbol, and m' is a sequence number of a PHICH group.

During an implementation, the NodeB sends the PHICH to user 1 on the above-mentioned PHICH resources which is determined for user 1; and the NodeB does not send a PDCCH on the PHICH resources.

The NodeB sends PHICH to user 2 on the above-mentioned PHICH resources which is determined for user 2; and the NodeB does not send PDCCH on the PHICH resources.

Neither user 1 nor user 2 monitors or receives the PDCCH on the above-mentioned PHICH resources.

Embodiment 15

As shown in FIG. 10, it is assumed that a UE-specific cell identity allocated by a NodeB to user 1 is $N_{veID1}^{cell}$ and a UE-specific cell identity allocated to user 2 is $N_{veID2}^{cell}$.

Firstly, the NodeB determines PHICH frequency domain resources for user 1 on the basis of the above-mentioned UE-specific cell identity of user 1 according to the following formula:

$$\overline{n}_i = \begin{cases} (\lfloor N_{vcID1}^{cell} \cdot n_{l'_i}/n_0 \rfloor + m') \bmod n_{l'_i} & i=0 \\ (\lfloor N_{vcID1}^{cell} \cdot n_{l'_i}/n_0 \rfloor + m' + \lfloor n_{l'_i}/3 \rfloor) \bmod n_{l'_i} & i=1 \\ (\lfloor N_{vcID1}^{cell} \cdot n_{l'_i}/n_0 \rfloor + m' + \lfloor 2n_{l'_i}/3 \rfloor) \bmod n_{l'_i} & i=2 \end{cases}$$

and specially, in a multicast/multi-casting broadcast single frequency network (MBSFN) sub-frame or in time division duplexing (TDD) system sub-frames 1 and 6, and in a case where the PHICH is in an extended PHICH duration, the NodeB determines the PHICH frequency domain resources for user 1 according to the following formula:

$$\overline{n}_i = \begin{cases} (\lfloor N_{vcID1}^{cell} \cdot n_{l'_i}/n_1 \rfloor + m') \bmod n_{l'_i} & i=0 \\ (\lfloor N_{vcID1}^{cell} \cdot n_{l'_i}/n_1 \rfloor + m' + \lfloor n_{l'_i}/3 \rfloor) \bmod n_{l'_i} & i=1 \\ (\lfloor N_{vcID1}^{cell} \cdot n_{l'_i}/n_1 \rfloor + m' + \lfloor 2n_{l'_i}/3 \rfloor) \bmod n_{l'_i} & i=2 \end{cases}$$

Secondly, the NodeB determines PHICH frequency domain resources for user 2 on the basis of the above-mentioned UE-specific cell identity for user 2 according to the following formula:

$$\overline{n}_i = \begin{cases} (\lfloor N_{vcID2}^{cell} \cdot n_{l'_i}/n_0 \rfloor + m') \bmod n_{l'_i} & i=0 \\ (\lfloor N_{vcID2}^{cell} \cdot n_{l'_i}/n_0 \rfloor + m' + \lfloor n_{l'_i}/3 \rfloor) \bmod n_{l'_i} & i=1 \\ (\lfloor N_{vcID2}^{cell} \cdot n_{l'_i}/n_0 \rfloor + m' + \lfloor 2n_{l'_i}/3 \rfloor) \bmod n_{l'_i} & i=2 \end{cases}$$

and specially, in an MBSFN sub-frame or in TDD system sub-frames 1 and 6 and in a case where the PHICH is in an extended PHICH duration, the NodeB determines the PHICH frequency domain resources for user 2 according to the following manners:

$$\overline{n}_i = \begin{cases} (\lfloor N_{vcID2}^{cell} \cdot n_{l'_i}/n_1 \rfloor + m') \bmod n_{l'_i} & i=0 \\ (\lfloor N_{vcID2}^{cell} \cdot n_{l'_i}/n_1 \rfloor + m' + \lfloor n_{l'_i}/3 \rfloor) \bmod n_{l'_i} & i=1 \\ (\lfloor N_{vcID2}^{cell} \cdot n_{l'_i}/n_1 \rfloor + m' + \lfloor 2n_{l'_i}/3 \rfloor) \bmod n_{l'_i} & i=2 \end{cases}$$

where $N_{veID1}^{cell}$ represents the UE-specific cell identity of user 1, $N_{veID2}^{cell}$ represents the UE-specific cell identity of user 2, $n_{l'_i}$ is the total number of remaining resource element groups (REGs) apart from a physical control format indicator channel (PCFICH) in the $l'_i$ th symbol, and m' is a sequence number of a PHICH group.

Furthermore, the NodeB determines a PHICH scrambling code for user 1 according to the UE-specific cell identity of user 1:

$$c_{init}^1 = (\lfloor n_s/2 \rfloor + 1) \cdot (2N_{veID1}^{cell} + 1) \cdot 2^9 + N_{veID1}^{cell},$$

and the NodeB determines a PHICH scrambling code for user 2 according to the cell identity of user 2:

$$c_{init}^2 = (\lfloor n_s/2 \rfloor + 1) \cdot (2N_{veID2}^{cell} + 1) \cdot 2^9 + N_{veID2}^{cell},$$

where $c_{init}^1$ is an initial value of a PHICH scrambling code sequence generator of user 1, $c_{init}^2$ is an initial value of a PHICH scrambling code sequence generator of user 2, $N_{veID1}^{cell}$ represents the UE-specific cell identity of user 1, $N_{veID2}^{cell}$ represents the UE-specific cell identity of user 2, and $n_s$ is a timeslot index.

During an implementation, the NodeB sends a PHICH to user 1 on the above-mentioned PHICH resources which is determined for user 1 according to a PHICH scrambling code of user 1; the NodeB does not send a PDCCH of user 1 to user 1 on the PHICH resources; user 1 descrambles the PHICH for user 1 according to the UE-specific cell identity of user 1; and the user 1 does not monitor or receive the PDCCH on the PHICH resources.

The NodeB sends a PHICH to user 2 on the above-mentioned PHICH resources which is determined for user according to a PHICH scrambling code of user 2; the NodeB does not send a PDCCH for user 2 to user 2 on the PHICH resources; user 2 descrambles the PHICH for user 2 according to the UE-specific cell identity of user 2; and the user 2 does not monitor or receive the PDCCH on the PHICH resources.

Embodiment 16

As shown in FIG. 10, it is assumed that a UE-specific cell identity allocated by a NodeB to user 1 is $N_{veID1}^{cell}$, and a UE-specific cell identity allocated to user 2 is $N_{veID2}^{cell}$.

Firstly, the NodeB determines PHICH frequency domain resources for user 1 on the basis of the above-mentioned UE-specific cell identity of user 1 according to the following formula:

$$\overline{n}_i = \begin{cases} (\lfloor N_{vcID1}^{cell} \cdot n_{l_i'} / n_1 \rfloor + m') \bmod n_{l_i'} & i=0 \\ (\lfloor N_{vcID1}^{cell} \cdot n_{l_i'} / n_1 \rfloor + m' + \lfloor n_{l_i'} / 3 \rfloor) \bmod n_{l_i'} & i=1 \\ (\lfloor N_{vcID1}^{cell} \cdot n_{l_i'} / n_1 \rfloor + m' + \lfloor 2n_{l_i'} / 3 \rfloor) \bmod n_{l_i'} & i=2 \end{cases},$$

and specially, in an MBSFN sub-frame or in TDD system sub-frames 1 and 6, and in a case where the PHICH is in an extended PHICH duration, the NodeB determines the PHICH frequency domain resources for user 1 according to the following formula:

$$\overline{n}_i = \begin{cases} (\lfloor N_{vcID1}^{cell} \cdot n_{l_i'} / n_1 \rfloor + m') \bmod n_{l_i'} & i=0 \\ (\lfloor N_{vcID1}^{cell} \cdot n_{l_i'} / n_1 \rfloor + m' + \lfloor n_{l_i'} / 3 \rfloor) \bmod n_{l_i'} & i=1 \\ (\lfloor N_{vcID1}^{cell} \cdot n_{l_i'} / n_1 \rfloor + m' + \lfloor 2n_{l_i'} / 3 \rfloor) \bmod n_{l_i'} & i=2 \end{cases},$$

Secondly, the NodeB determines PHICH frequency domain resources for user 2 on the basis of the above-mentioned UE-specific cell identity of user 2 according to the following formula:

$$\overline{n}_i = \begin{cases} (\lfloor N_{vcID2}^{cell} \cdot n_{l_i'} / n_0 \rfloor + m') \bmod n_{l_i'} & i=0 \\ (\lfloor N_{vcID2}^{cell} \cdot n_{l_i'} / n_0 \rfloor + m' + \lfloor n_{l_i'} / 3 \rfloor) \bmod n_{l_i'} & i=1 \\ (\lfloor N_{vcID2}^{cell} \cdot n_{l_i'} / n_0 \rfloor + m' + \lfloor 2n_{l_i'} / 3 \rfloor) \bmod n_{l_i'} & i=2 \end{cases},$$

and specially, in an MBSFN sub-frame or in TDD system sub-frames 1 and 6, and in a case where the PHICH is in an extended PHICH duration, the NodeB determines the PHICH frequency domain resources for user 2 according to the following formula:

$$\overline{n}_i = \begin{cases} (\lfloor N_{vcID2}^{cell} \cdot n_{l_i'} / n_1 \rfloor + m') \bmod n_{l_i'} & i=0 \\ (\lfloor N_{vcID2}^{cell} \cdot n_{l_i'} / n_1 \rfloor + m' + \lfloor n_{l_i'} / 3 \rfloor) \bmod n_{l_i'} & i=1 \\ (\lfloor N_{vcID2}^{cell} \cdot n_{l_i'} / n_1 \rfloor + m' + \lfloor 2n_{l_i'} / 3 \rfloor) \bmod n_{l_i'} & i=2 \end{cases},$$

where $N_{veID1}^{cell}$ represents the UE-specific cell identity of user 1, $N_{veID2}^{cell}$ represents the UE-specific cell identity of user 2, $n_{l_i'}$ is the total number of remaining resource element groups (REGs) apart from a physical control format indicator channel (PCFICH) in the $l_i'$ th symbol, and m' is a sequence number of a PHICH group.

Furthermore, the NodeB determines a PHICH scrambling code for user 1 according to the UE-specific cell identity of user 1:

$$c_{init}^1 = (\lfloor n_s/2 \rfloor + 1) \cdot (2N_{veID1}^{cell} + 1) \cdot 2^9 + N_{veID1}^{cell},$$

and the NodeB determines a PHICH scrambling code for user 2 according to the UE-specific cell identity of user 2:

$$c_{init}^2 = (\lfloor n_s/2 \rfloor + 1) \cdot (2N_{veID2}^{cell} + 1) \cdot 2^9 + N_{veID2}^{cell},$$

where $c_{init}^1$ is an initial value of a PHICH scrambling code sequence generator for user 1, $c_{init}^2$ is an initial value of a PHICH scrambling code sequence generator for user 2, $N_{veID1}^{cell}$ represents the UE-specific cell identity of user 1, $N_{veID2}^{cell}$ represents the UE-specific cell identity of user 2, and $n_s$ is a timeslot index.

During an implementation, the NodeB sends the PHICH to user 1 on the above-mentioned PHICH resources which is determined for user 1 according to a PHICH scrambling code of user 1; and the NodeB does not send any PDCCH on the PHICH resources.

The NodeB sends a PHICH to user 2 on the above-mentioned PHICH resources which is determined for user 2 according to a PHICH scrambling code of user 2; and the NodeB does not send any PDCCH on the resources.

Neither user 1 nor user 2 monitors or receives the PDCCH on the above-mentioned PHICH resources.

In summary, the embodiments of the disclosure relate to a transmission method for PHICH in a long term evolution advanced system (referred to as LTE-Advanced). A NodeB determines PHICH resources and/or scrambles the PHICH according to a UE-specific manner, so that the problems of PHICH capacity insufficiency, PHICH collisions and interference that caused by the number of user in single cell much larger than that in traditional cell in the related art are solved, the capacity of physical hybrid ARQ indicator channel on downlink resources is improved, and the interference that caused by PHICH collisions is reduced.

Obviously, those skilled in the art shall understand that the above-mentioned entities and steps of the disclosure can be realized by using general purpose calculating device, can be integrated in one calculating device or distributed on a network which consists of a plurality of calculating devices. Alternatively, the entities and the steps of the disclosure can be realized by using the executable program code of the calculating device. Consequently, they can be stored in the storing device and executed by the calculating device, or they are made into integrated circuit entity respectively, or a plurality of entities or steps thereof are made into one integrated circuit entity. In this way, the disclosure is not restricted to any particular hardware and software combination.

The above description is only preferred embodiments of the disclosure and is not intended to limit the disclosure, and the disclosure can have a variety of changes and modifications for those skilled in the art. Any modification, equivalent replacement, or improvement made within the spirit and principle of the disclosure shall all fall within the protection scope of the disclosure.

What is claimed is:

1. A transmission method for Physical Hybrid ARQ Indicator Channel (PHICH), comprising:
   a NodeB determining PHICH resources according to a UE-specific manner, wherein the NodeB determining the PHICH resources according to the UE-specific manner comprises: the NodeB determining PHICH frequency domain resources according to a UE-specific cell identity; and scrambling the PHICH using a currently used PHICH scrambling code according to the UE-specific manner, wherein the NodeB scrambling the PHICH using the currently used PHICH scrambling code according to the UE-specific manner comprises:

the NodeB scrambling the PHICH using a currently used PHICH scrambling code according to a UE-specific cell identity; and the NodeB sending the scrambled PHICH on the determined PHICH resources; wherein before the NodeB determines the PHICH resources and scrambling the PHICH using the currently used PHICH scrambling code according to the UE-specific manner, the NodeB notifying the UE-specific cell identity to a user terminal via UE-specific Radio Resource Control (RRC) signaling; and wherein after the NodeB sends the scrambled PHICH on the determined PHICH resources, the method further comprises: the user terminal descrambling the received scrambled PHICH according to the UE-specific cell identity to which the user terminal belongs.

2. The method according to claim 1, wherein the UE-specific cell identity is a UE-specific cell identity used for determining a physical downlink demodulation reference signal.

3. The method according to claim 1, wherein in a case where the PHICH is in an extended PHICH duration, the NodeB determining the PHICH frequency domain resources, which are in a multicast broadcast single frequency network sub-frame or time division duplexing system sub-frames 1 and 6 according to a following formula:

$$\bar{n}_i = \begin{cases} (\lfloor N_{vcID}^{cell} \cdot n_{l'_i}/n_1 \rfloor + m') \bmod n_{l'_i} & i=0 \\ (\lfloor N_{vcID}^{cell} \cdot n_{l'_i}/n_1 \rfloor + m' + \lfloor n_{l'_i}/3 \rfloor) \bmod n_{l'_i} & i=1 \\ (\lfloor N_{vcID}^{cell} \cdot n_{l'_i}/n_1 \rfloor + m' + \lfloor 2n_{l'_i}/3 \rfloor) \bmod n_{l'_i} & i=2 \end{cases},$$

Where $N_{veID}^{cell}$ is the UE-specific cell identity, $n_{l'_i}$ is the total number of remaining resource element groups (REGs), apart from a Physical Control Format Indicator Channel (PCFICH), in the $l'_i$ th symbol, m' is a sequence number of a PHICH group, and $n_i$ is $n_{l'_i}$ when $l'_i=1$.

4. The method according to any one of claim 3, wherein after the NodeB does not send a physical downlink control channel to a user on PHICH resources to which the user belongs, and the NodeB sends the scrambled PHICH on the determined PHICH resources, the method further comprises:

the user terminal, which receives the scrambled PHICH, does not monitor or receive the physical downlink control channel on the PHICH resources to which the user terminal belongs.

5. The method according to of claim 3, wherein after the NodeB does not send the physical downlink control channel on the PHICH resources, and the NodeB sends the scrambled PHICH on the determined PHICH resources, the method further comprises:

the user terminal, which receives the scrambled PHICH, does not monitor or receive the physical downlink control channel on the PHICH resources.

6. The method according to claim 1, wherein in a case where the PHICH is in a normal extended duration, the NodeB determining the PHICH frequency domain resources, apart from the multicast broadcast single frequency network sub-frame and the time division duplexing system sub-frames 1 and 6 according to a following formula:

$$\bar{n}_i = \begin{cases} (\lfloor N_{vcID}^{cell} \cdot n_{l'_i}/n_0 \rfloor + m') \bmod n_{l'_i} & i=0 \\ (\lfloor N_{vcID}^{cell} \cdot n_{l'_i}/n_0 \rfloor + m' + \lfloor n_{l'_i}/3 \rfloor) \bmod n_{l'_i} & i=1 \\ (\lfloor N_{vcID}^{cell} \cdot n_{l'_i}/n_0 \rfloor + m' + \lfloor 2n_{l'_i}/3 \rfloor) \bmod n_{l'_i} & i=2 \end{cases},$$

Where $N_{veID}^{cell}$ is the UE-specific cell identity, $n_{l'_i}$ is the total number of the remaining resource element groups (REGs), apart from a Physical Control Format Indicator Channel (PCFICH), in the $l'_i$ th symbol, m' is a sequence number of a PHICH group, and $n_0$ is $n_{l'_i}$ when $l'_i=0$.

7. The method according to claim 1, wherein the NodeB determines the PHICH scrambling code according to the following formula:

$$c_{init}=(\lfloor n_s/2 \rfloor+1) \cdot (2N_{veID}^{cell}+1) \cdot 2^9 + N_{veID}^{cell},$$

Where $c_{init}$ is an initial value of a scrambling code sequence generator, $N_{veID}^{cell}$ is the UE-specific cell identity, and $n_s$ is a timeslot index.

8. A transmission device for a Physical Hybrid Repeat Request Checking Indicator Channel (PHICH), wherein the device is located on a NodeB side and comprises:

a preprocessing circuitry configured to determine PHICH frequency domain resources according to a UE-specific cell identity; and scramble the PHICH using a currently used PHICH scrambling code according to a UE-specific cell identity;

a sending circuitry configured to send the scrambled PHICH on the determined PHICH frequency domain resources; and a notification circuitry configured to notify the UE-specific cell identity to a user terminal via UE-specific Radio Resource Control (RRC) signaling.

9. A user terminal, comprising:

a receiving circuitry configured to receive a scrambled Physical Hybrid Repeat Request Checking Indicator Channel (PHICH) from a NodeB, wherein the scrambled PHICH is sent on PHICH frequency domain resources determined by the NodeB according to a UE-specific cell identity, and the scrambled PHICH is a PHICH which is scrambled by the NodeB using a currently used PHICH scrambling code according to a UE-specific cell identity; and a descrambling circuitry configured to descramble the received scrambled PHICH according to the UE-specific cell identity to which the user terminal belongs.

* * * * *